US012775425B1

(12) United States Patent
Bao et al.

(10) Patent No.: US 12,775,425 B1
(45) Date of Patent: Oct. 27, 2026

(54) DATA PROCESSING UNIT ACCELERATED TIERING AND CACHING FOR ARTIFICIAL INTELLIGENCE DATA LOADING

(71) Applicant: Dell Products L.P., Round Rock, TX (US)

(72) Inventors: Qi Bao, Acton, MA (US); Xiangping Chen, Sherborn, MA (US); Prakash Nara, Austin, TX (US); Xunce Zhou, Harvard, MA (US); Ykaro Rocha, Blackstone, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/223,787

(22) Filed: May 30, 2025

(51) Int. Cl.
*G06F 3/06* (2006.01)

(52) U.S. Cl.
CPC ............ *G06F 3/0661* (2013.01); *G06F 3/062* (2013.01); *G06F 3/0637* (2013.01); *G06F 3/067* (2013.01)

(58) Field of Classification Search
CPC ...... G06F 3/0661; G06F 3/062; G06F 3/0637; G06F 3/0608; G06F 3/061; G06F 3/0611; G06F 3/0622; G06F 3/0623; G06F 3/0685; G06F 3/0647; G06F 3/0656; G06F 3/067; G06F 12/1458
See application file for complete search history.

(56) References Cited

U.S. PATENT DOCUMENTS

| | | | | |
|---|---|---|---|---|
| 2006/0031224 | A1* | 2/2006 | Haugh | G06F 16/2471 |
| 2019/0004942 | A1* | 1/2019 | Fujii | G06F 3/0689 |
| 2023/0418468 | A1* | 12/2023 | Shah | G06F 3/0604 |
| 2024/0185100 | A1* | 6/2024 | Ihsani | G16H 30/40 |
| 2024/0419585 | A1* | 12/2024 | Kachare | G06F 3/0631 |
| 2025/0110670 | A1* | 4/2025 | Erickson | G06F 3/0631 |
| 2025/0123746 | A1* | 4/2025 | Park | G06F 3/0673 |
| 2025/0138955 | A1* | 5/2025 | Shpilyuck | G06F 11/1451 |

* cited by examiner

*Primary Examiner* — Michael Krofcheck
(74) *Attorney, Agent, or Firm* — Amin, Turocy & Watson, LLP

(57) ABSTRACT

The subject technologies relate to data processing unit (DPU) accelerated tiering and caching for artificial intelligence (AI) data loading. An example method facilitates DPU-accelerated tiering and caching for AI data loading and includes loading a dataset stored at a first location of a system in response to a request received by a DPU from a host computing environment for access to the dataset, the first location being known to the DPU and not known to the host computing environment, where the dataset is stored at the first location in a first format; storing a transformed dataset, resulting from the DPU transforming the dataset from the first format to a second, different format, at a second location of the system that is different from the first location; and facilitating the access to the transformed dataset by the host computing environment at the second location of the system.

20 Claims, 10 Drawing Sheets

DATA PROCESSING UNIT ACCELERATED TIERING AND CACHING FOR ARTIFICIAL INTELLIGENCE DATA LOADING

BACKGROUND

During training for artificial intelligence (AI) models, data is gathered from various sources that can potentially utilize different access protocols, local and/or shared file systems, local and/or cloud object stores, and/or other associated properties. AI training applications generally use a common and uniform dataset interface to load and transform data from these different data locations and/or access protocols. This dataset interface can be implemented via the use of an AI data loader, which can be part of, or separate from, associated AI training applications.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an example implementation, a system is described herein. The system can include at least one data processing unit (DPU) and at least one memory that stores executable instructions that, when executed by the at least one DPU, facilitate performance of operations. The operations can include, in response to a request received by the at least one DPU from a host computing environment for access to a dataset stored by a data storage system, accessing the dataset at a first location of the data storage system, the first location of the data storage system being known to the at least one DPU and not known to the host computing environment. The operations can further include storing a transformed dataset, resulting from a transformation of the dataset by the at least one DPU from a first format of the dataset as stored at the first location to a second format that is not the first format, at a second location of the data storage system that is not the first location. The operations can additionally include enabling the access to the transformed dataset by the host computing environment at the second location of the data storage system.

In another example implementation, a method is described herein. The method can include loading, by a first system comprising at least one DPU, a dataset stored at a first location of a second system in response to a request received by the at least one DPU from a host computing environment for access to the dataset, where the first location is known to the at least one DPU and not known to the host computing environment, and where the dataset is stored at the first location in a first format. The method can also include storing, by the first system, a transformed dataset, resulting from the at least one DPU transforming the dataset from the first format to a second format that is different from the first format, at a second location of the second system that is different from the first location. The method can further include facilitating, by the first system, the access to the transformed dataset by the host computing environment at the second location of the second system.

In an additional example implementation, a non-transitory machine-readable medium is described herein that can include instructions that, when executed by at least one DPU, facilitate performance of operations. The operations can include loading a dataset stored at a first location of a data storage system in response to a request received from a computing system for access to the dataset, where the first location is known to the at least one DPU and not known to the computing system, and where the dataset is stored at the first location in a first format; storing a transformed dataset, resulting from transforming the dataset from the first format to a second format that is different from the first format, at a second location of the data storage system that is different from the first location; and enabling the access to the transformed dataset by the computing system at the second location of the data storage system.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
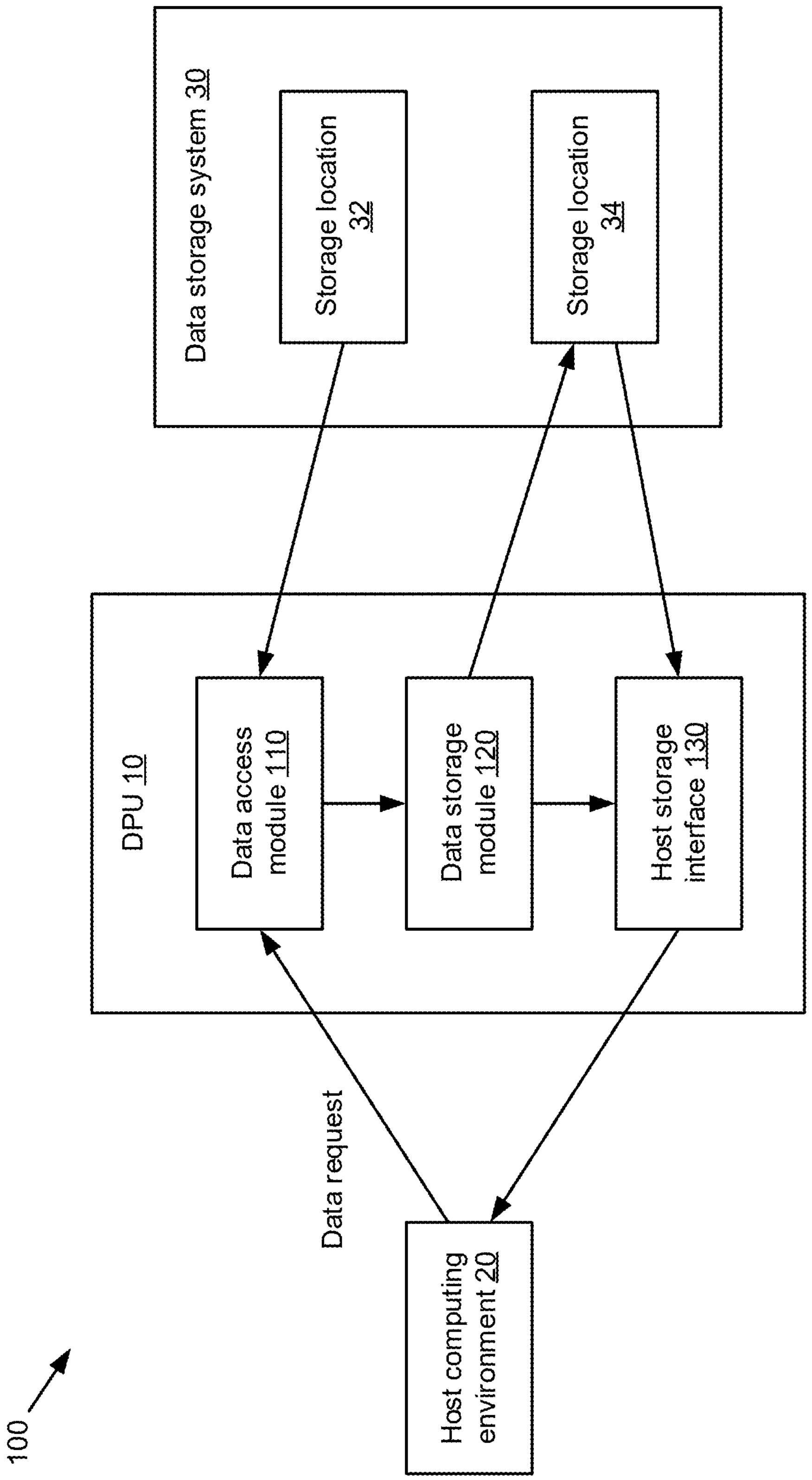
FIGS. 1-6 are block diagrams of respective systems that facilitate DPU-accelerated tiering and caching for AI data loading in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

As mentioned in the background, artificial intelligence (AI) training applications generally use a common and uniform dataset interface to load and transform data from different data locations and/or according to different data access protocols. This generally increases the complexity of a general-purpose AI data loader due to the need to handle different data sources, access protocols, access credentials, and/or other properties. Additionally, it is desirable to use high-performance storage for AI training operations in order to keep associated graphics processing units (GPUs) at a high rate of utilization. While tiered storage can be used to balance performance and capacity needs, storage tiering further complicates data access since data could move between tiers with different access methods.

Furthermore, it is often desirable to transform data (e.g., via decompression, etc.) when loading the data to memory for training. Some types of AI training, such as neural network (NN) based training, can often require the same data set to be loaded and transformed many times. Accordingly, it is desirable to transform the data only once and save a copy of the transformed data for subsequent reloading. In addition, to enhance security associated with AI data loading and/or other purposes, it is further desirable to implement application programming interface (API) abstraction to hide different storage clients in a trusted environment.

In consideration of these and/or other issues, various implementations described herein relate to the use of data processing unit (DPU) accelerated tiering and caching for AI data loading and/or other purposes. Example implementations as described herein can improve AI training performance by offloading data processing and/or data access operations to a DPU, resulting in increased speed for these and/or other operations relative to conventional systems that utilize local central processing units (CPUs) and/or GPUs for such purposes. Further example implementations described herein enable the use of a DPU as a secure proxy for accessing data storage systems and performing tiering and/or transformation of data in a manner that is transparent to an end user (e.g., a data scientist or other suitable user) and/or the AI training applications that utilize the associated data. As a result, a DPU as described herein can enable the automation of data processing tasks associated with AI data loading, AI training, or other suitable functions based on access credentials, logical rules, and/or other information contained in secure storage associated with the DPU without requiring the end user to manually provide said information or write customized code. This, in turn, can enable a user to perform complex data loading and AI training operations even if the user lacks the knowledge required to perform said operations manually.

As an additional benefit of example implementations described herein, performing data tiering and/or transformation tasks via a DPU can enable enhanced trust and security in connection with data loading and/or AI training. For instance, a DPU as described herein can shield and/or otherwise hide details of an underlying data storage system from an associated host environment, which can enable the DPU to establish a trusted network with the data storage system. The DPU can then leverage this trusted environment to enable random dynamic memory access (RDMA) and/or other similar features in order to further enhance data loading performance.

With reference now to the drawings, FIG. 1 illustrates a block diagram of a system 100 that facilitates DPU-accelerated tiering and caching for AI data loading in accordance with various implementations described herein. System 100 as shown in FIG. 1 includes a DPU 10 that can be associated with executable components, e.g., a data access module 110, a data storage module 120, and a host storage interface 130, each of which can operate as described in further detail below.

In an example implementation, the components 110, 120, 130 of system 100 can be implemented in hardware, software, or a combination of hardware and software. By way of example, the components 110, 120, 130 can be stored on at least one memory, which can be internal and/or external to the DPU 10, and executed by the DPU 10. An example of a general purpose computer architecture that can be used to perform computing functions generally is shown and described in further detail below with respect to FIG. 10, and an example of a DPU that can be utilized to implement the components 110, 120, 130, and/or other components as will be described in further detail below, is shown and described below with reference to FIG. 11.

Additionally, while each of the components 110, 120, 130 shown in FIG. 1 are associated with a single DPU 10, it is noted that the functionality of the respective components shown and described herein can be implemented via a single DPU 10 and/or a combination of DPUs 10, which could be associated with a single computing device or multiple devices. For instance, in various implementations, the data access module 110 shown in FIG. 1 could be implemented via a first device, the data storage module 120 could be implemented via the first device or a second device, and the host storage interface 130 could be implemented via the first device, the second device, or a third device. Also, or alternatively, the functionality of a single component could be divided among multiple devices in some implementations.

As further shown in FIG. 1, the DPU 10 can interact with a host computing environment 20, which can be implemented via one or more computing devices and include an operating system, applications, and/or any other suitable components that can interact with the DPU as described herein. While the DPU 10 and host computing environment 20 are illustrated in FIG. 1 as separate blocks, it is noted that the DPU 10 and host computing environment 20 could reside within the same physical device. For instance, the host computing environment 20 could be implemented via a server device or other computing device, and the DPU 10 could be implemented via an expansion card (e.g., a peripheral component interconnect express (PCIe) card or the like) that is located in the same computing device on which the host computing environment 20 resides.

As will be described in further detail below, various applications running within the host computing environment 20 can interact with the DPU 10 to leverage functionality of the DPU 10 and/or its components 110, 120, 130. This can occur via the base functionality of the application(s) themselves and/or via application plugins that are specifically designed to facilitate host/DPU interaction. An example of an application plugin that can be used in this manner is described in further detail below with reference to FIG. 6.

As additionally shown in FIG. 1, the DPU 10 can also interact with a data storage system 30, which can include one or more storage devices that can store data to be utilized by the host computing environment 20 for AI training and/or other purposes. The data storage system 30 shown in FIG. 1 includes multiple storage locations, here two storage locations 32, 34, which can correspond to different types (tiers) of storage devices. For example, storage location 32 can correspond to a "capacity tier" that includes comparatively high-capacity, low-speed storage devices, such as hard disk drives (HDDs) or the like, and storage location 34 can correspond to a "performance tier" that includes comparatively lower capacity, high-speed storage devices, such as non-volatile memory express (NVMe) drives, persistent memory, and/or other suitable devices. While only two storage locations 32, 34 are shown in FIG. 1, it is noted that the data storage system 30 can include any suitable number of locations and/or tiers provided that at least two storage locations and/or tiers are present.

In some implementations, the storage locations 32, 34 of the data storage system 30 can be in different physical locations. For instance, storage location 32 can correspond to a first bank of storage devices at a first physical location, and storage location 34 can correspond to a second bank of storage devices at a second physical location. These physical locations can be associated with the same computing site, e.g., a data center or other computing site that also includes the host computing environment 20 and the DPU 10, and/or different computing sites. For instance, one or more storage locations 32, 34 associated with the data storage system 30 could include virtual storage devices associated with a cloud computing environment that is maintained at a separate computing site to the remainder of system 100. In the event that one or more of the storage locations 32, 34 are located at an external site relative to the DPU 10, the DPU 10 can communicate with said external site via a wired and/or wireless network connection. In some implementations, storage drives or other storage devices associated with an individual storage location 32, 34 could also be distributed across multiple physical locations and/or computing sites. An example computing network architecture that includes a host computing environment 20, a DPU 10, and a data storage system 30 is described in further detail below with reference to FIG. 7.

With reference now to the components of system 100, the data access module 110 can, in response to a request received by the DPU 10 from the host computing environment 20 for access to a dataset stored by the data storage system 30, access the dataset at a first location 32 of the data storage system 30. To facilitate enhanced trust and security, the first location 32 of the data storage system 30 can be known to the DPU 10 and obscured from (i.e., not known to) the host computing environment 20.

The data storage module 120 of system 100 can store a transformed dataset, resulting from a transformation of the dataset by the DPU 10 from a first format of the dataset as stored at the first location 32 of the data storage system 30 to a second format that is not the first format, at a second location 34 of the data storage system 30 that is not the first location 32. Further details regarding techniques that can be utilized by the DPU 10 to transform data are provided below with reference to FIGS. 2-3. Additionally, techniques that can be utilized by the data access module 110 and data storage module 120 to securely access locations 32, 34 of the data storage system 30 are described in further detail below with reference to FIG. 4.

The host storage interface 130 of system 100 can enable access to the transformed dataset by the host computing environment 20 at the second location 34 at which the transformed dataset was stored by the data storage module 120. In an implementation, the host storage interface 130 can enable access to the transformed dataset via a virtual file system, which will be described in further detail below with reference to FIG. 7.

As will be described in further detail below, system 100 as shown in FIG. 1 can be used to implement a dataset virtualization framework that leverages DPUs as a secure data processing platform to accelerate AI storage tiering and transformation. Details regarding storage access protocols, topology configurations, access credentials, and/or other information that can be used in moving data among different storage backend systems can be saved on the DPU 10 and isolated from applications running on the host computing environment 20, e.g., as will be described below with reference to FIG. 4. A data processing hardware accelerator associated with the DPU 10 can also be used to further offload encryption, compression, and data network transfer services, e.g., as will be described below with reference to FIGS. 2-4.

In an example implementation, a dataset virtualization framework that utilizes system 100 can be implemented as follows:

First, a data loader library running on the host computing environment 20 can provide a generic interface to access and iterate through data items for AI training and inferencing applications, define options for data loading and transformation for data loading services running on the DPU 10, and communicate with a data loading service running on the DPU 10 to load and transform data from different sources. Further details regarding example implementations of the data loader library are described in further detail below with reference to FIGS. 6-7.

Additionally, a data loading service running on the DPU 10 can be used to provide a virtualized file service to host applications through a PCIe channel (e.g., a virtio-fs file system over virtio-pcie transport, etc.), as will be described in further detail below with reference to FIGS. 6-7. The data loading service of the DPU 10 can additionally set up access to a storage backend with different access protocols, security credentials, performance, and capacity characteristics. Based on this storage backend, the data loading service can build a multi-tier storage architecture and move data between tiers to optimize for speed and efficiency as well as persist storage tiering registry information in a secure vault in the DPU 10 that is inaccessible to the host computing environment 20 and its applications. Establishment and use of a multi-tier storage architecture in this manner is described in further detail below with reference to FIG. 4. Additionally, the data loading service can transform raw datasets, e.g., into tensors, and cache tensors and/or other transformed data in high-performance storage for accelerated data loading and/or reloading during AI model training, e.g., as will be described in further detail below with reference to FIGS. 3-4.

Further, to establish secure communication between the data loader library on the host computing environment 20 and the data loading service on the DPU 10, a private internal virtual network switch can be established between the host computing environment 20 and the DPU 10. Further details regarding this communication mechanism are described in further detail below with reference to FIG. 7.

Figure 2:
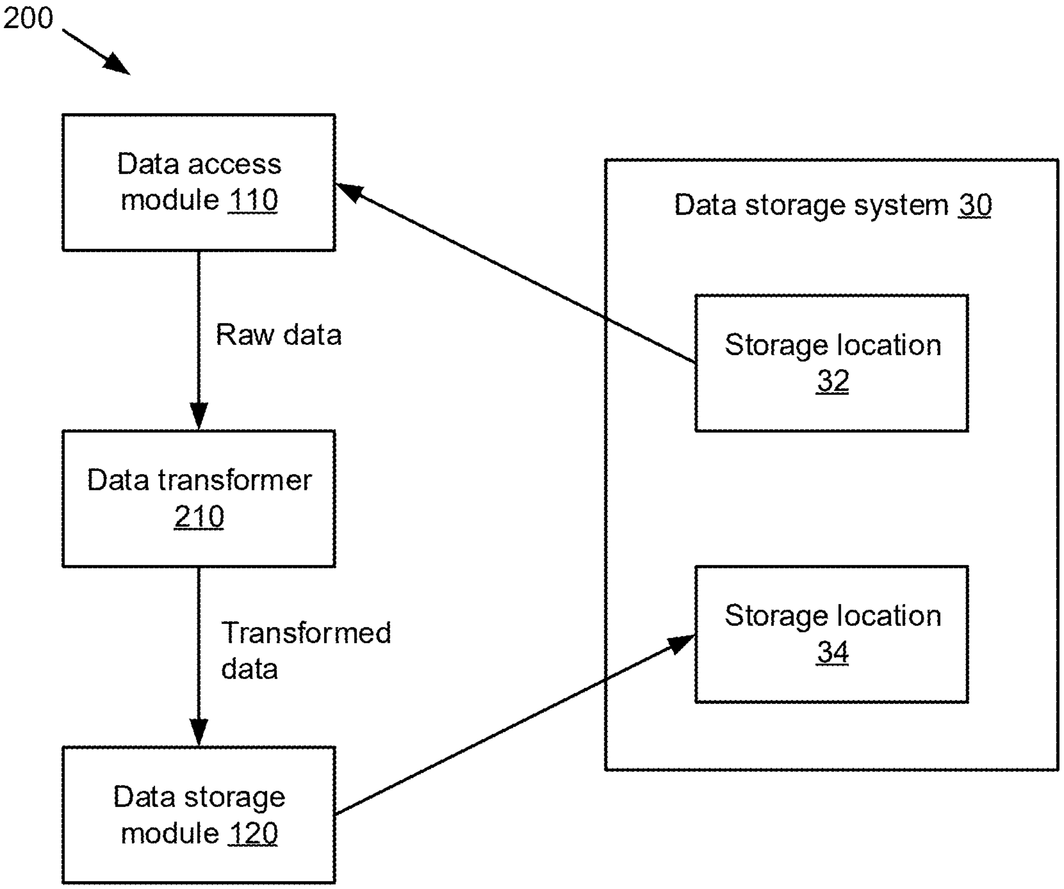

With reference now to FIG. 2, a block diagram of another system 200 that facilitates DPU-accelerated tiering and caching for AI data loading is illustrated. Repetitive description of like parts described above with regard to other implementations is omitted for brevity. System 200 as shown in FIG. 2 includes a data access module 110 and a data storage module 120 that can function as described above with respect to FIG. 1. In addition, system 200 as shown in FIG. 2 includes a data transformer 210 that can function as described below. While a DPU 10 is not shown in FIG. 2 for simplicity of illustration, it is noted that the components 110, 120, 210 of system 200 can be associated with one or more DPUs 10 in a similar manner to that described above with reference to FIG. 1.

In an example implementation as shown by FIG. 2, the data access module 110 can load a dataset from a first location 32 of a data storage system 30, e.g., a location associated with capacity tier storage of the data storage system 30, in a first (raw) format. The data transformer 210 can facilitate transformation of the retrieved dataset into a different format, e.g., a format more suitable for AI training applications or the like, and this transformed dataset can then be stored by the data storage module 120 to a second location 34 of the data storage system 30, e.g., a location associated with performance tier storage of the data storage system 30.

Figure 3:
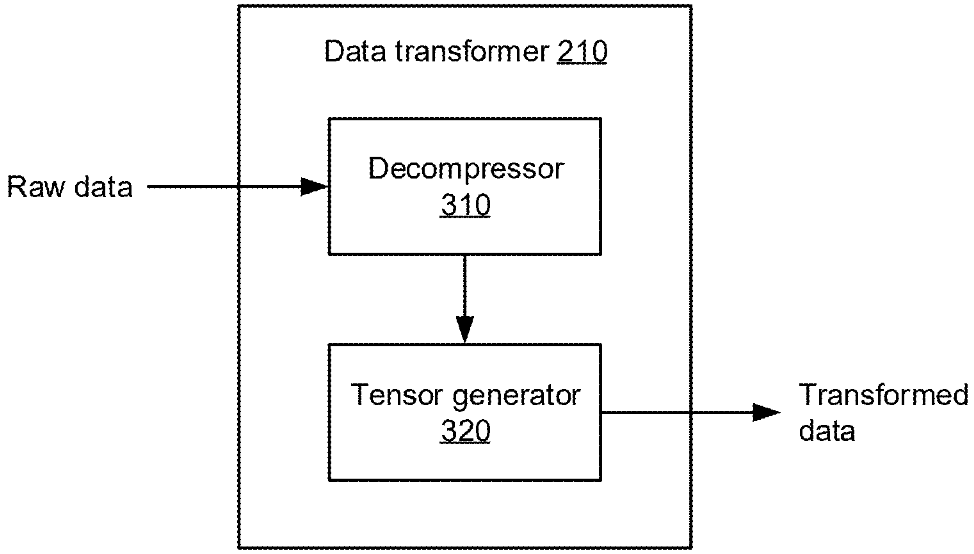

Turning to FIG. 3, and with further reference to FIG. 2, various functions that can be performed by the data transformer 210 are shown in further detail via representative functional components, namely a decompressor 310 and a tensor generator 320. As shown in FIG. 3, the data transformer 210 can accept as input a raw dataset, which can include compressed data (e.g., compressed image data, compressed video data, compressed audio data, etc.). The decompressor 310 can convert this compressed data into uncompressed data, e.g., using one or more decompression algorithms known in the art. Using this uncompressed data, the tensor generator 320 can generate tensors representative of the input dataset, and these tensors can be provided as the transformed dataset to the data storage module 120 for storage at the second storage location 34 as shown in FIG. 2.

In some implementations, raw data provided to the data transformer 210 could itself be uncompressed, e.g., due to the raw data being stored at the first storage location 32 in an uncompressed format, decompression being performed by components other than the data transformer 210, etc. In such an implementation, the raw data could be provided directly to the tensor generator 320 shown in FIG. 3 for tensor generation without first converting the data to an uncompressed format.

By utilizing the data transformer 210 shown in FIGS. 2-3, system 200 can facilitate a preprocessing step that transforms raw datasets into tensors, which can then be cached for faster access during AI model training. DPUs can be used to perform these transformations and manage the caching process (e.g., by implementing the components 110, 120, 210 of system 200 via hardware accelerators and/or other DPU components), which can reduce redundant computations and accelerate data loading times.

In an example implementation, the data transformer 210 of system 200 can enable expedited data transformation, movement of data within storage tiers, and/or other operations to facilitate faster AI data loading and/or other operations. For instance, with reference again to FIG. 1, conventional data loading generally involves manually transferring raw data from the data storage system 30 to the host computing environment 20 and then using a graphics processing unit (GPU) or CPU associated with the host computing environment 20 to transform the raw data into tensors. However, data decompression via the host computing environment 20 can be a very time consuming operation, especially for raw data that is highly compressed (e.g., at a 10:1 compression ratio or above) and/or includes large files (e.g., high resolution medical images, etc.). As an example, a single compressed medical image can often be over 20 megabytes in size, and a standard CPU can take 10-30 milliseconds to transform a single such image. For a large dataset, e.g., a dataset that includes thousands of similar images, this can be a significant time burden. In contrast, by using DPU hardware acceleration (e.g., via the data transformer 210 of system 200), this process can be made significantly faster.

Figure 4:
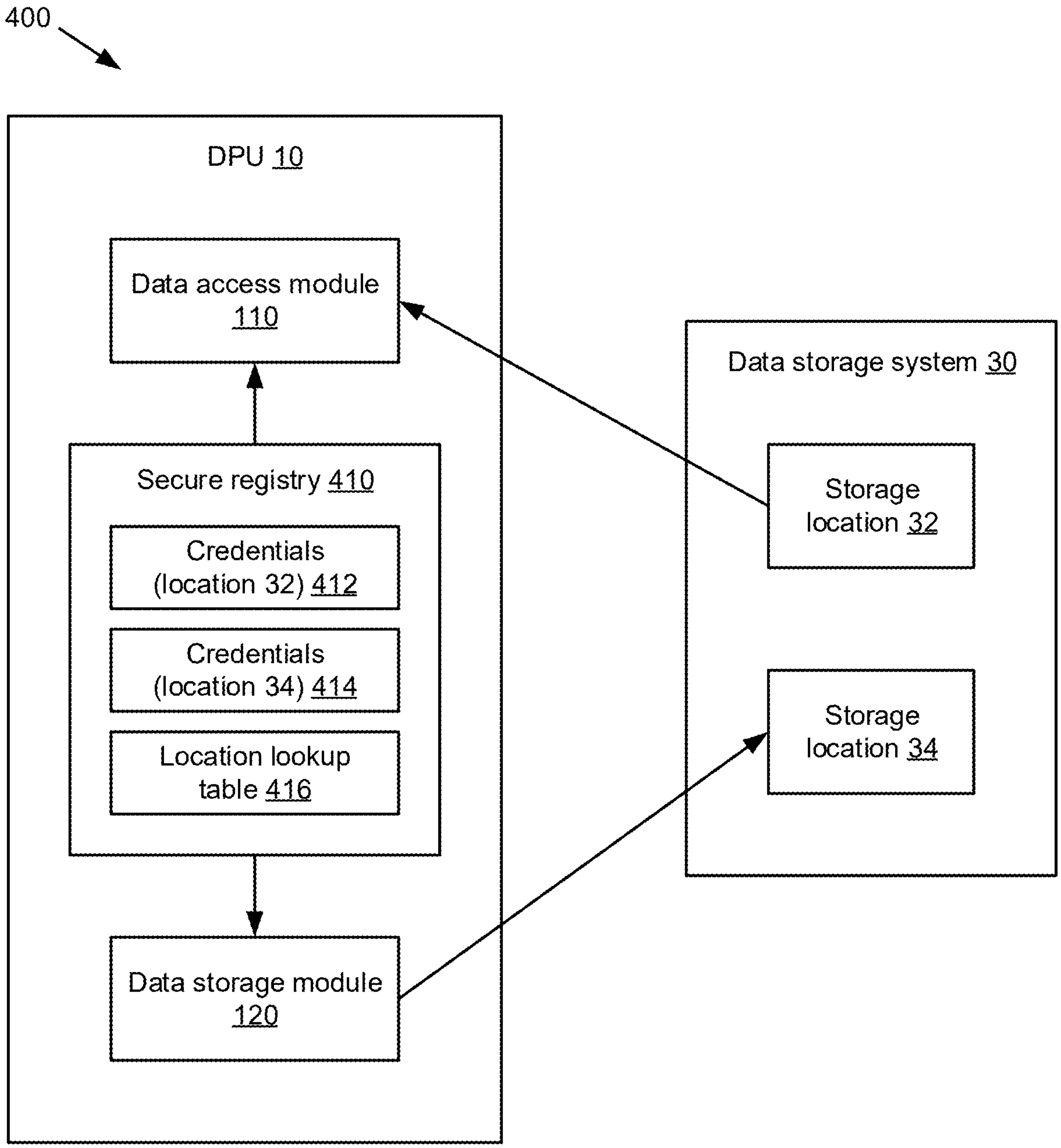

Turning next to FIG. 4, a block diagram of still another system 400 that facilitates DPU-accelerated tiering and caching for AI data loading is illustrated. Repetitive description of like parts described above with regard to other implementations is omitted for brevity. System 400 as shown in FIG. 4 includes a DPU 10, which can utilize a data access module 110 and a data storage module 120 to interact with data stored via a data storage system 30, e.g., as described above with reference to FIG. 1. As further shown in FIG. 4, the DPU 10 of system 400 can include a secure registry 410, which can be utilized to store information locally on the DPU 10. In some implementations, the secure registry 410 can also be referred to as a data vault or secure vault, internal storage, secure storage, and/or by any other suitable terms. In various implementations, the secure registry 410 can include one or more local storage devices, such as memory modules, memory cards (such as secure digital (SD) cards or the like), and/or any other suitable device(s). Additionally, while the secure registry 410 is illustrated in FIG. 4 as part of the DPU 10, it is noted that in some implementations, the secure registry 410 could be associated with a storage device that is independent of the DPU 10. In such an implementation, a secure data connection can be established between the DPU 10 and the secure registry 410 to facilitate security and privacy of data stored on the secure registry 410, e.g., such that data associated with the secure registry 410 is not accessible to a host computing environment and/or other system entities other than the DPU 10.

As shown in FIG. 4, the secure registry 410 can include credentials and/or other information that can enable the DPU 10 to access and process data from various locations 32, 34 of the data storage system 30. For instance, the secure registry 410 shown in FIG. 4 includes first credentials (authentication credentials, security credentials, etc.) 412 for the first location 32 of the data storage system 30 as well as second credentials 414 for the second location 34 of the data storage system 30. The credentials 412, 414 can include passwords, access keys, and/or any other suitable information that can be utilized by the DPU 10 to access the respective locations 32, 34 of the data storage system 30. By way of example, the data access module 110 can access a dataset at the first location 32 of the data storage system 30 using the first credentials 412, and the data storage module 120 can store a corresponding transformed dataset to the second location 34 of the data storage system 30 using the second credentials 414.

In addition to, or in place of, the credentials 412, 414, the secure registry 410 can also store other information to facilitate access by the DPU 10 to the respective locations 32, 34 of the data storage system 30. For instance, the secure registry 410 can store information relating to data access protocols used by the data storage system 30 and/or its respective locations 32, 34. As a result, the data access module 110 can access the first storage location 32 via a first data access protocol associated with a first storage device type utilized for the first storage location 32, and the data storage module 120 can access the second storage location 34 via a second data access protocol associated with a second storage device type utilized for the second storage location 34, based on information stored by the secure registry and/or other suitable information.

As further shown in FIG. 4, the secure registry 410 can include a lookup table 416 and/or other data structure that associates various datasets, or other data units, with the locations of the data storage system 30 on which those data units are stored. In an implementation in which different locations (e.g., locations 32, 34) of the data storage system 30 correspond to different storage tiers, information associated with the lookup table 416, along with the credentials 412, 414 and/or any other suitable information relating to the locations of the data storage system 30, can be referred to as "tiering registry information." Generation and use of tiering registry information in this manner is described in further detail below with reference to FIG. 7.

Figure 5:
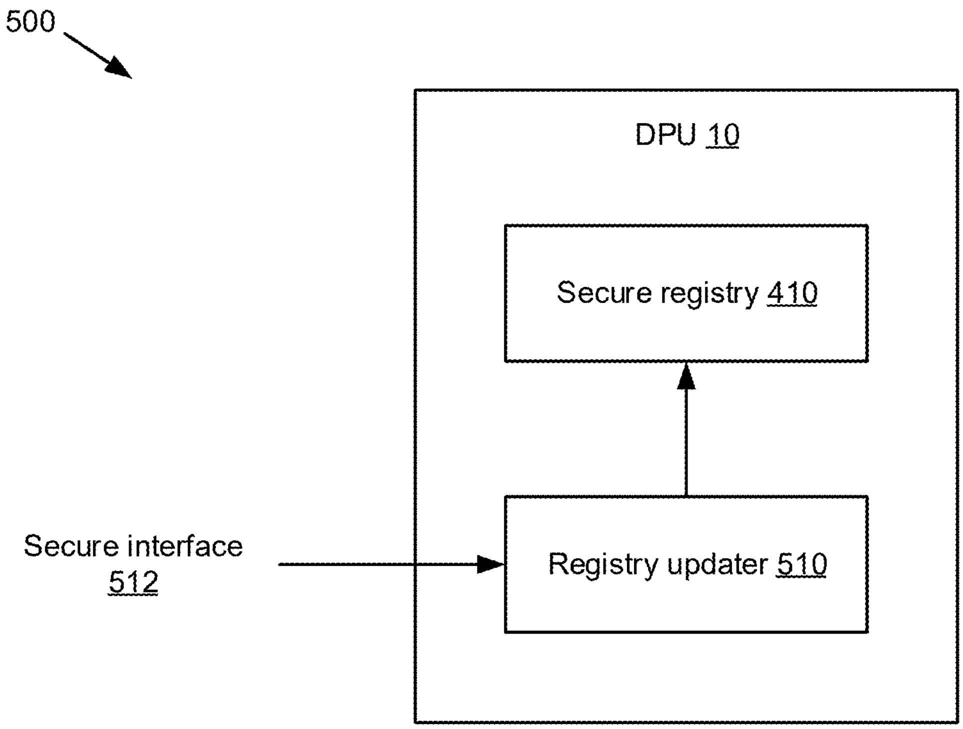

Referring to FIG. 5, and with further reference to FIG. 4, a system 500 that facilitates updating tiering registry information and/or other information stored via the secure registry 410 of a DPU 10 is provided. System 500 as shown in FIG. 5 includes a registry updater 510 associated with the DPU 10, which can provide a secure interface 512 to the DPU 10 for purposes of updating the information stored in the secure registry 410. In an example implementation, the secure interface 512 can be provided by way of an application programming interface (API) and/or other suitable interface that enables information in the secure registry 410 to be written and/or updated without exposing that information to an underlying computing environment, such as the host computing environment 20 shown in FIG. 1.

In an example implementation, the registry updater 510 and secure interface 512 can facilitate pre-configuration of access credentials and/or other information associated with accessing data on a data storage system 30, e.g., prior to a time at which the DPU 10 is used for data loading operations. As a result, subsequent data loading can be performed by the DPU using this pre-configured information without exposing potentially sensitive details of the data storage system 30 to a host environment and/or its components (e.g., CPUs or other processors, applications, etc.) during runtime.

Figure 6:
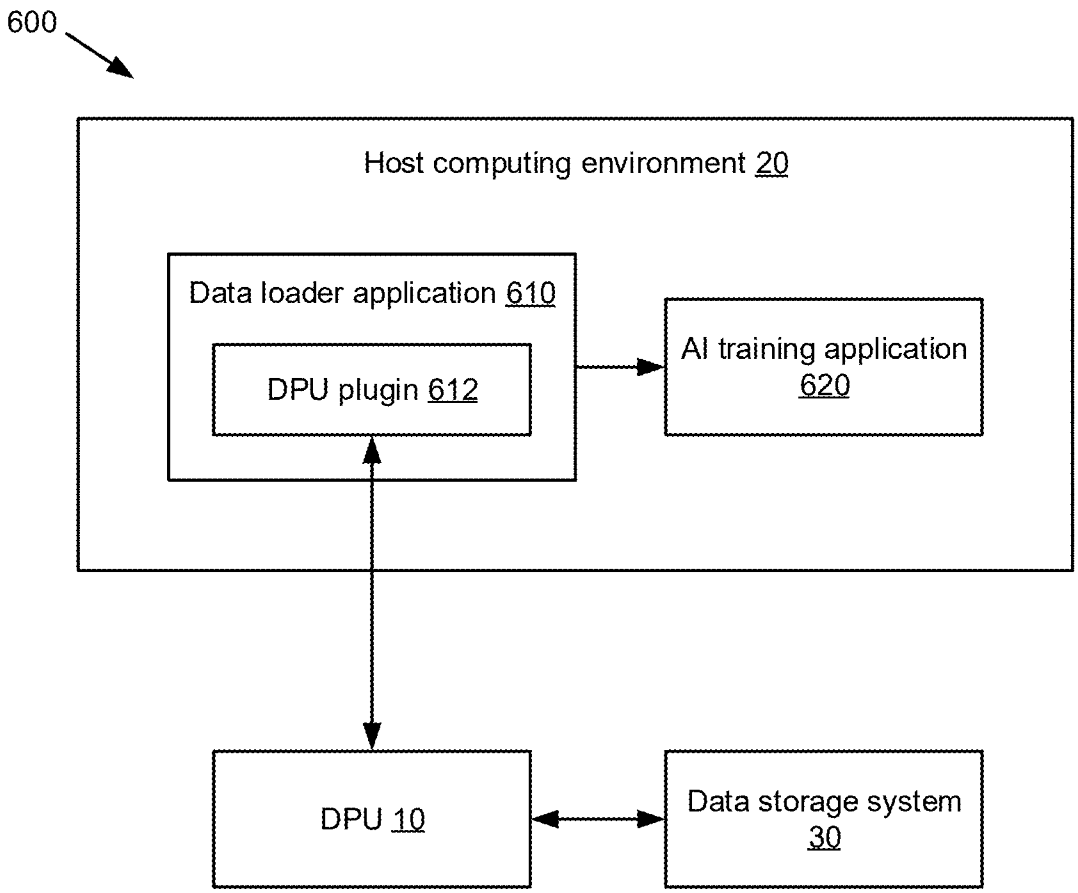

Moving now to FIG. 6, a block diagram of a system 600 that facilitates host environment interaction with a DPU 10 as described above is illustrated. Repetitive description of like parts described above with regard to other implementations is omitted for brevity. System 600 as shown in FIG. 6 includes a host computing environment 20 from which various applications are run, including a data loader application 610 and an AI training application 620. In various implementations, the AI training application 620 can be associated with one or more AI model building platforms, such as those presently existing (e.g., PyTorch, TensorFlow, etc.) or developed in the future.

While the data loader application 610 and AI training application 620 are illustrated in FIG. 6 as separate entities, it is noted that, in some implementations, functionality of the data loader application 610 and AI training application 620 could be incorporated into a common application. For instance, the AI training application 620 can be associated with an AI framework (e.g., PyTorch, TensorFlow, etc.), and the data loader application 610 can be implemented as a library associated with the AI framework. Also or alternatively, the host computing environment 20 could include multiple data loader applications 610, and/or AI training applications 620, that can perform the same and/or different functions.

As further shown in FIG. 6, the data loader application (library) 610 can be extended with a plugin 612 that enables communication between the data loader application 610 and the DPU 10. This plugin 612 can, e.g., provide and/or extend dataset loading APIs associated with the data loader application 610 to facilitate storage-related functions of the DPU 10. By way of example, the data loader application 610, via the plugin 612, can submit a request for a given dataset residing on a data storage system 30 from the DPU 10. This request can include, e.g., information regarding the requested dataset such as a dataset identifier, a type of the requested data (e.g., image data, video data, etc.), a category of the requested data, or the like. In response, the DPU 10 can facilitate access to the requested data as stored on the data storage system 30, e.g., as described above with reference to FIG. 1. Once the data loader application 610 has obtained access to the requested data via the DPU 10, the data loader application 610 can then provide the requested dataset, including any transformations to the dataset as applied by the DPU 10 as described above, to an AI training application 620 residing on the host computing environment 20 and/or other suitable applications.

Figure 7:
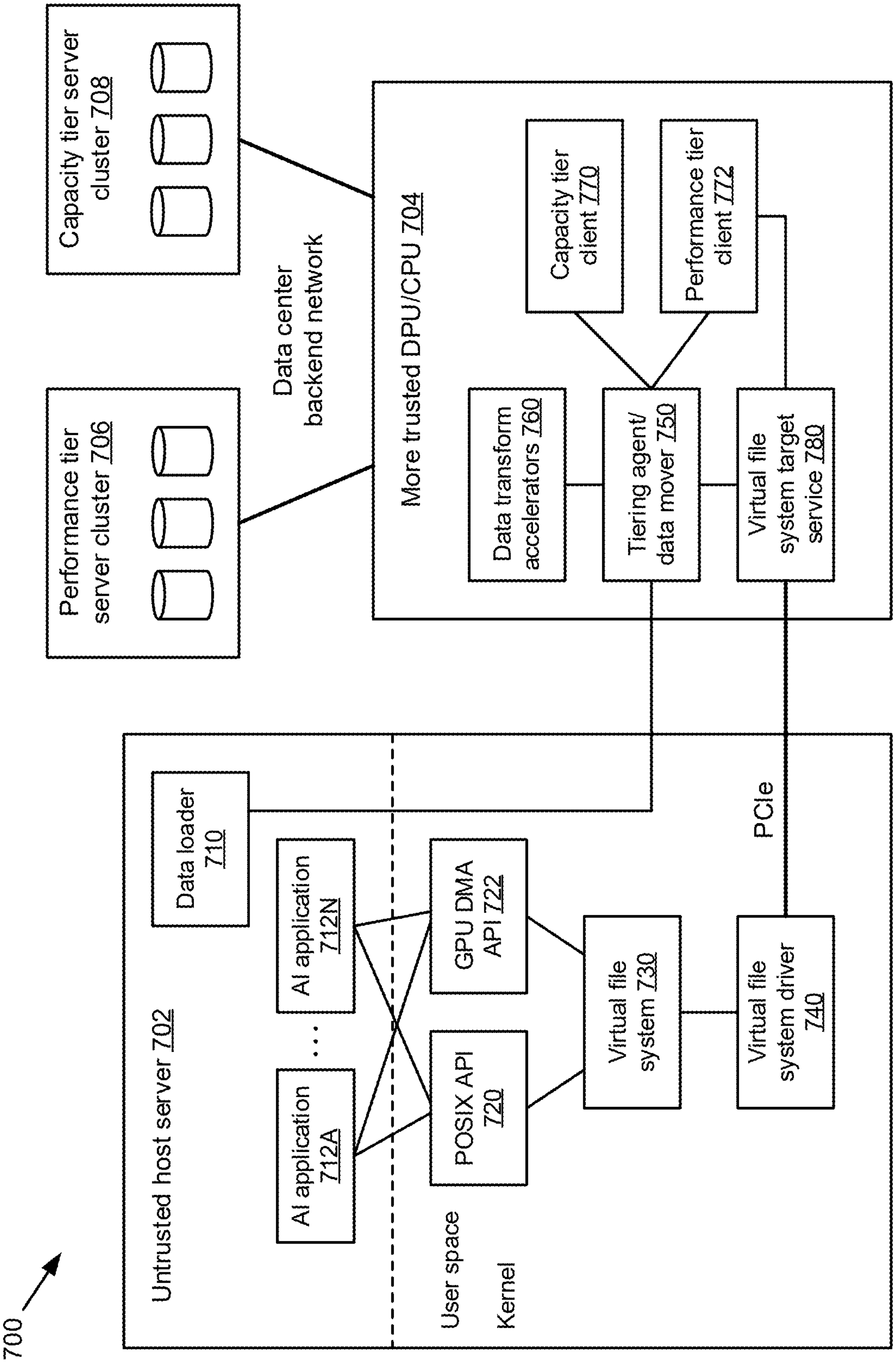
FIG. 7 is a diagram depicting an example computing network environment in which various implementations described herein can function.

Turning to FIG. 7, a diagram depicting an example computing network environment 700 in which various implementations described herein can function is provided. The environment 700 shown in FIG. 7 includes an untrusted host server 702, e.g., that can implement some or all functionality of the host computing environment 20 described above, which can interact with a more trusted DPU and/or CPU 704 (referred to herein as simply "DPU 704"), e.g., that can implement some or all functionality of the DPU 10 described above. As shown in FIG. 7, the host server 702 can run a data loader 710, which is an application and/or library that can provide data to one or more AI applications 712, here N AI applications 712A-712N, for training and/or other purposes. It is noted that the numbering convention used for the AI applications 712 is not intended to imply any specific number of AI applications 712.

In an implementation, the data loader 710 can be provided as part of a software framework running on the host server 702 for purposes of AI training, e.g., via the AI applications 712. As described above with respect to FIG. 6, the data loader 710 can be extended with a plugin and/or other means that enable communication between the data loader 710 and the DPU 704, as will be described in further detail below. Communication between the data loader 710 and the DPU 704 can be conducted through an internal network between the host server 702 and the DPU 704, e.g., via a PCIe connection that communicatively couples the DPU 704 to the host server 702, and/or through an out-of-band communication mechanism.

The AI applications 712 running on the host server 702 can further interact with one or more APIs, such as a portable operating system interface (POSIX) API 720 and a GPU dynamic memory access (DMA) API 722. These APIs 720, 722 can, in turn, interact with a virtual file system 730 via a virtual file system driver 740, as will be described in further detail below. In a non-limiting example implementation, the virtual file system 730 can be and/or otherwise incorporate the functionality of the virtio-fs storage virtualization facility, and the virtual file system driver 740 can be a PCIe communication mechanism provided via virtio-fs. Other implementations are also possible.

The DPU 704 shown in FIG. 7 can provide secure storage mechanisms that can ensure data integrity and security during the preprocessing and caching stages of a dataset transfer. To this end, the DPU 704 can include a tiering agent/data mover 750, which can manage the transferal of data between respective tiers of a storage system, here a performance tier 706 and a capacity tier 708, as well as between the storage system and the host server 702. In an implementation, the performance tier 706 can include high-performance, low-capacity storage devices in a similar manner to storage location 32 as described above, and the capacity tier 708 can include lower-performance, higher-capacity storage devices in a similar manner to storage location 34 as described above.

The tiering agent/data mover 750 can facilitate tiering and data movement in a way that is transparent to the host server 702, as well as facilitate namespace consolidation for the respective tiers 706, 708 of the storage system to simplify operations. Additionally, the tiering agent/data mover 750 can perform secure data storage services with storage access credentials, fabric, and/or other information that is isolated from the host server 702, thereby enhancing security.

The DPU 704 shown in FIG. 7 further includes data transform accelerators 760, which can transform (e.g., decompress, represent as tensors, etc.) a dataset in a manner that is transparent to the host server 702, which can reduce the processing load on the host server 702. The data transform accelerators 760, along with the tiering agent/data mover 750, can additionally cache transformed data in storage associated with the performance tier 706, which can save CPU cost on repeated load and transform operations.

As further shown in FIG. 7, the DPU 704 can include respective clients and/or other components, here a capacity tier client 770 and a performance tier client 772, which can facilitate communication between the DPU 704 and the respectively corresponding tiers 706, 708 of the storage system. The DPU 704 can also include a virtual file system target service 780, e.g., which can be implemented as part of virtio-fs and/or another suitable file system, to facilitate communication between the DPU 704 and the host server 702.

As an example of operation of the data loader 710 within the environment 700 shown in FIG. 7, a data scientist or other user can utilize an AI application 712 to train a machine learning model. To load a dataset for model training, the AI application 712 can pass code to the data loader 710 that utilizes a dataset object, and this dataset object can include the plugin utilized by the data loader 710 for communication with the DPU 704. In an implementation, this code can be provided as part of a request provided by the AI application 712 (e.g., through its user) for retrieval of the corresponding dataset. In contrast to conventional approaches, however, this request need not contain details regarding the location of the dataset, associated credentials, or other specifics relating to the dataset, as these details are handled by the DPU 704 transparently to the host server 702. As a result, the complexity of this request can be significantly reduced, e.g., such that the request can be provided via an AI application in simple, generic terms that do not require specific knowledge relating to programming or data access protocols.

When a request for a dataset is received by the DPU 704, the tiering agent/data mover 750 can initially determine the location of the dataset among the storage tiers 706, 708. In some cases, a dataset may be stored at one or more of the storage tiers 706, 708 in a format that differs from a format that is usable by the AI applications 712 of the host server 702. In such a scenario, the data transform accelerators 760 can be used to transform the dataset prior to transferal of the dataset to the host server 702. By way of specific, non-limiting example, the data loader 710 can submit a request for an image-related dataset to the DPU 704. In response to this request, the tiering agent/data mover 750 can determine that the requested dataset is stored on the capacity tier 708 as compressed images. The tiering agent/data mover 750 can then, via the capacity tier client 770, load the compressed images from the capacity tier 708, using credentials for the capacity tier 708 that are securely stored on the DPU 704. Once loaded, the DPU 704, via the data transform accelerators 760, can first uncompress the compressed images, e.g., into raw pixel arrays, and then transform the uncompressed images into tensors and/or another data format that is suitable for consumption by the AI applications 712. The tiering agent/data mover 750 can then, via the performance tier client 772, write the tensor-converted dataset to the performance tier 706, again using credentials for the performance tier 706 that are securely stored on the DPU 704. In response to the tensor data being successfully written to the performance tier 706, the tiering agent/data mover 750 can then inform the data loader 710, via the DPU plugin, that the requested dataset is ready for use by the AI applications 712 at the performance tier 706 of the storage system. As noted above, the transformed data can subsequently be made available to the AI applications 712 via the data loader 710 from the performance tier 706, which can save resources by avoiding re-tiering and re-transforming the dataset on subsequent accesses.

By utilizing one or more implementations as described above, a generic data loader interface can be provided to a host environment, e.g., a host computing environment 20 as shown in FIG. 1, which can hide the details of remote storage access and tiering optimizations from applications running on that environment. Instead, tiered data access and movement can be initiated and conducted by a data loading service running on a DPU, e.g., a DPU 10 as shown in FIG. 1, isolated from the host environment. For instance, data transformation can be offloaded to the DPU and accelerated using hardware accelerators associated with the DPU. Transformed data can then be stored in a high-performance storage tier for high-performance data loading and reloading. As further described herein, sensitive storage access credentials, and/or other sensitive information, can be securely stored in a DPU vault or other secure storage associated with a DPU. The use of one or more implementations as described herein can reduce the burden associated with manually configuring storage access, which can quickly increase in complexity as the number of storage sources increases. Additionally, implementations described herein can mitigate issues associated with limited memory cache capacity, which can lead to repeated and/or inefficient remote data loading and transformation. Further, implementations described herein can function without exposing remote storage accesses to applications running on the host, which can be vulnerable to malicious attacks, particularly in cases in which remote memory access is enabled.

Figure 8:
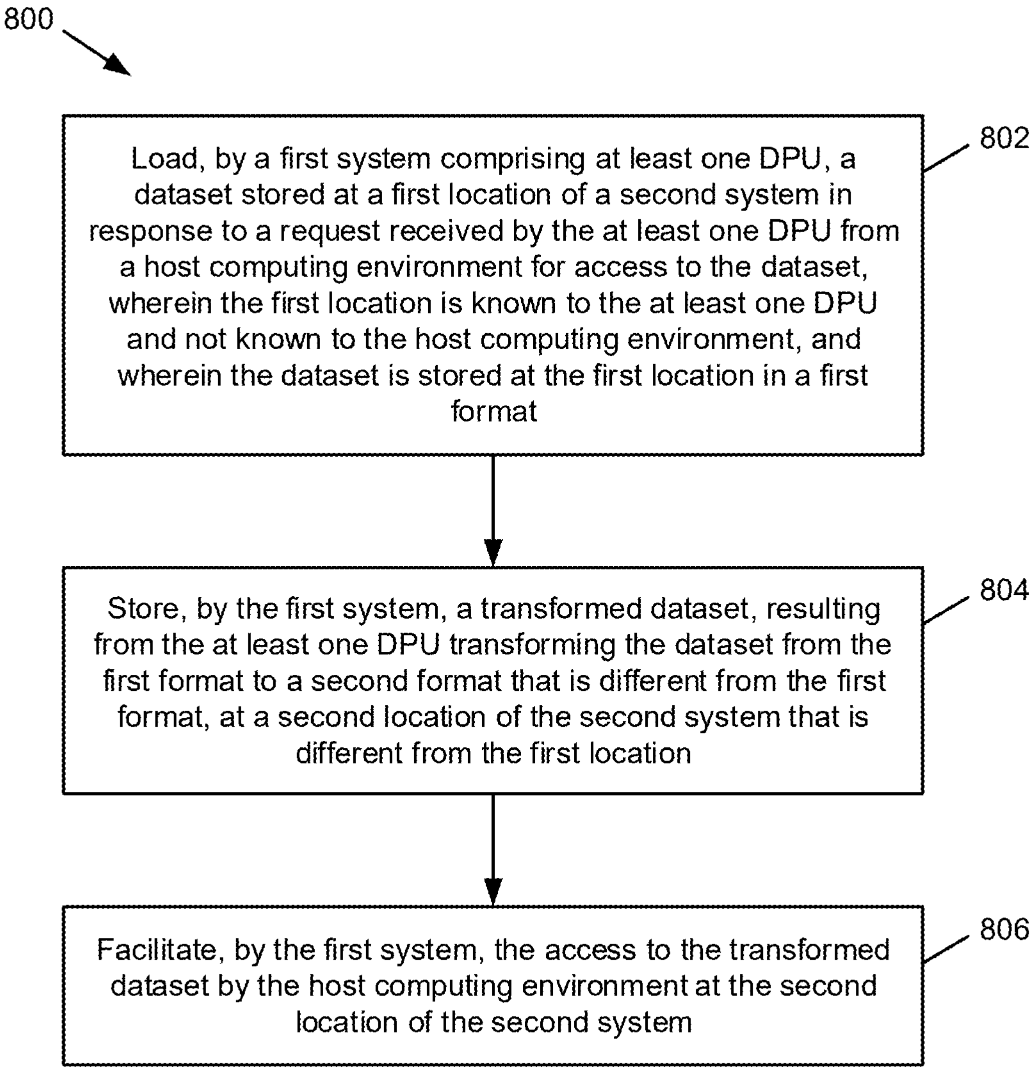
FIGS. 8-9 are flow diagrams of respective methods that facilitate DPU-accelerated tiering and caching for AI data loading in accordance with various implementations described herein.

Referring now to FIG. 8, a flow diagram of a method 800 that facilitates DPU-accelerated tiering and caching for AI data loading is illustrated. At 802, a first system comprising at least one DPU (e.g., a DPU 10) can load (e.g., by a data access module 110) a dataset stored at a first location (e.g., a storage location 32) of a second system (e.g., a data storage system 30) in response to a request received by the at least one DPU from a host computing environment (e.g., a host computing environment 20) for access to the dataset. The first location can be known to the at least one DPU and not known to the host computing environment, and the dataset can be stored at the first location in a first format.

At 804, the first system can store (e.g., by a data storage module 120) a transformed dataset, resulting from the at least one DPU transforming the dataset from the first format to a second format that is different from the first format, at a second location (e.g., a storage location 34) of the second system that is different from the first location.

At 806, the first system can facilitate (e.g., by a host storage interface 130) the access to the transformed dataset by the host computing environment, e.g., as requested at 802, at the second location of the second system.

Figure 9:
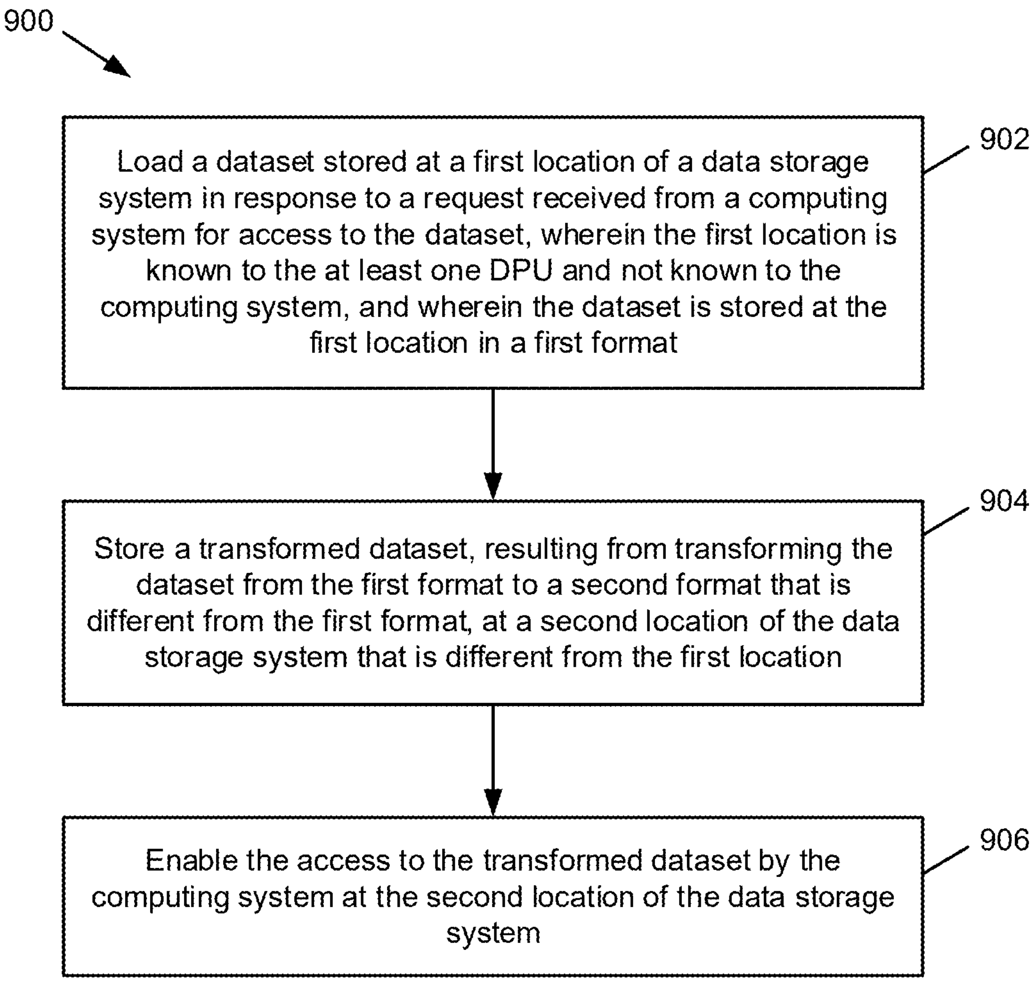

Referring next to FIG. 9, a flow diagram of a method 900 that can be performed by at least one DPU, e.g., based on machine-executable instructions stored on a non-transitory machine-readable medium, is illustrated. An example of a computer architecture, including a processor and non-transitory media, that can be utilized to implement method 900 is described below with reference to FIG. 10, and an example of a DPU that can be utilized to implement method 900 is described below with reference to FIG. 11.

Method 900 can begin at 902, in which the at least one DPU can load a dataset stored at a first location of a data storage system in response to a request received from a computing system for access to the dataset. The first location can be known to the at least one DPU and not known to the computing system, and the dataset can be stored at the first location in a first format.

At 904, the at least one DPU can store a transformed dataset, resulting from transforming the dataset from the first format to a second format that is different from the first format, at a second location of the data storage system that is different from the first location.

At 906, the at least one DPU can enable the access to the transformed dataset by the computing system at the second location of the data storage system.

FIGS. 8-9 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 10:
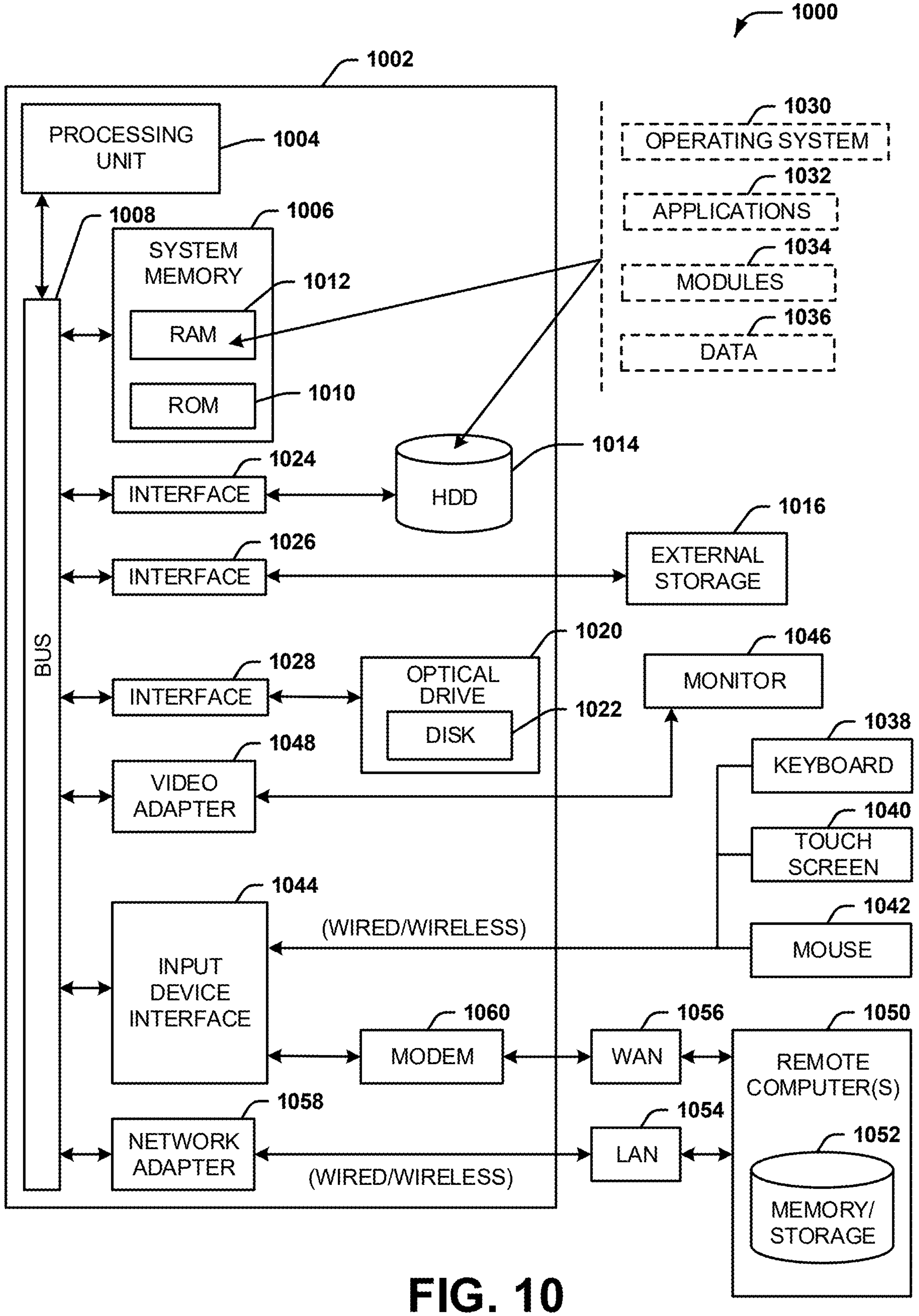
FIG. 10 is a diagram of an example computing environment in which various implementations described herein can function.
Figure 11:
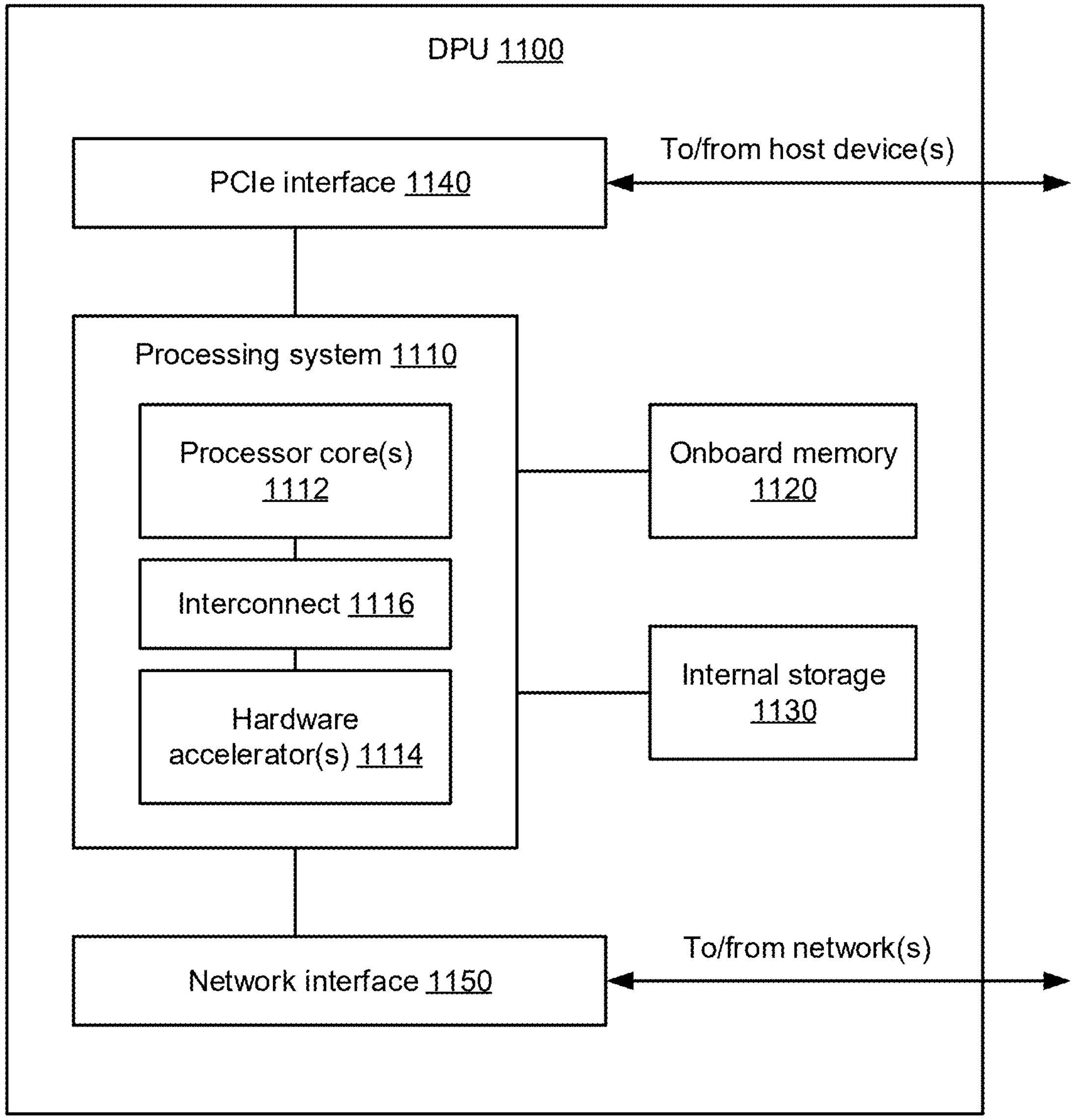
FIG. 11 is a diagram of an example DPU architecture in which various implementations described herein can function.

In order to provide additional context for various embodiments described herein, FIGS. 10-11 and the following discussion are intended to provide a brief, general description of a suitable computing environment 1000 and DPU 1100, respectively, in which the various embodiments of the embodiment described herein can be implemented. While implementations have been described above in the general context of computer-executable instructions that can run on one or more computers, those skilled in the art will recognize that the embodiments can also be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 10, an example general-purpose environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD), a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can also be connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Turning next to FIG. 11, a high-level architecture diagram of an example DPU 1100 is provided. It is noted that the architecture shown in FIG. 11 is merely one example of a DPU architecture that could be used and that other architectures are also possible. The DPU 1100 shown in FIG. 11 includes a processing system 1110, which can include one or more processor cores 1112, one or more hardware accelerators 1114, and an interconnect 1116 that can facilitate communication between the processor cores 1112 and hardware accelerators 1114. In an implementation, the processing system 1110 can include a general-purpose processor, such as an ARM (advanced RISC [reduced instruction set computer] machine) processor similar to those commonly found in smartphones or other small form factor devices, on which some or all of the processor cores 1112 can be located.

The hardware accelerators 1114 can include and/or otherwise incorporate the functionality of specialized hardware circuits or units, such as application-specific integrated circuits (ASICs) or the like, that can be designed and/or optimized to efficiently perform tasks of a defined type, such as data processing (e.g., file compression or decompression, data type conversion, etc.), network-related functions, and/or any other suitable functions. The interconnect 1116 can include any suitable means for communicatively coupling the processor cores 1112 and the hardware accelerators 1114 to facilitate high-speed data communication within different elements of the processing system 1110.

As further shown in FIG. 11, the DPU 1100 can include internal data storage hardware, such as onboard memory 1120 and/or internal storage 1130, which can be accessed by the processing system 1110 via a bus and/or other suitable data communication interface. The onboard memory 1120 can be composed of one or more memory modules and/or other suitable memory components, e.g., in a similar manner to the ROM 1010 and/or RAM 1012 described above with reference to FIG. 10. The internal storage 1130 can include one or more flash memory modules, memory cards (e.g., SD cards, etc.), and/or other small-form-factor data storage devices that can store data relevant to the operation of the DPU 1100. This data can include, for instance, a DPU BIOS and/or other relevant operating instructions, data pertaining to communication protocols utilized by the DPU 1100, access credentials and/or other security-related information that is desirably withheld from a host computing environment in which the DPU 1100 operates, and/or other suitable data.

The DPU 1100 shown in FIG. 11 also includes a PCIe interface 1140 that can facilitate communication between the DPU 1100 and one or more host devices that are physically coupled to the DPU 1100 via a PCIe connection. By way of example, the DPU 1100 can be implemented as a PCIe expansion card, and the PCIe interface 1140 can facilitate communication between the DPU 1100 and a computing device into which the PCIe expansion card is inserted. In some implementations, the PCIe interface 1140 can also include the functionality of a PCIe switch, e.g., to regulate PCIe communication between the DPU 1100 and one or more other devices connected to a given host device via respective PCIe connections.

The DPU 1100 of FIG. 11 further includes a network interface 1150, e.g., a network interface controller (NIC), which can operate in a similar manner to the network adapter 1058 described above with reference to FIG. 10 to facilitate communication by the DPU 1100 over one or more wired and/or wireless networks. In some implementations, the network interface 1150 of the DPU 1100 can serve as a general network interface for one or more host devices to which the DPU 1100 is connected, e.g., via the PCIe interface 1140, in which case the DPU 1100 can also be referred to as a "Smart NIC" due to its enhanced data processing functionality relative to a conventional NIC.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such a feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:

at least one data processing unit (DPU); and at least one memory that stores executable instructions that, when executed by the at least one DPU, facilitate performance of operations, the operations comprising:

in response to a request received by the at least one DPU from a host computing environment for access to a dataset stored by a data storage system, accessing the dataset at a first location of the data storage system, the first location of the data storage system being known to the at least one DPU and not known to the host computing environment;

storing a transformed dataset, resulting from a transformation of the dataset by the at least one DPU from a first format of the dataset as stored at the first location to a second format that is not the first format, at a second location of the data storage system that is not the first location; and enabling the access to the transformed dataset by the host computing environment at the second location of the data storage system.

2. The system of claim 1, wherein the first location of the data storage system is associated with a first storage device type having a first access speed, and wherein the second location of the data storage system is associated with a second storage device type having a second access speed that is faster than the first access speed.

3. The system of claim 2, wherein the accessing of the dataset comprises accessing the dataset at the first location of the data storage system via a first data access protocol associated with the first storage device type, and wherein the storing of the transformed dataset comprises storing the transformed dataset at the second location of the data storage system via a second data access protocol associated with the second storage device type.

4. The system of claim 1, wherein the accessing of the dataset comprises accessing the dataset at the first location of the data storage system based on credentials stored in a registry maintained by the at least one DPU, and wherein the registry is inaccessible to the host computing environment.

5. The system of claim 4, wherein the credentials are written to the registry via a secure interface to the at least one DPU.

6. The system of claim 1, wherein the first format is a compressed format, and wherein the second format is a tensor format resulting from converting the dataset from the compressed format to an uncompressed format and generating tensors representative of the dataset in the uncompressed format.

7. The system of claim 1, wherein the operations further comprise:

in response to storing the transformed dataset, associating the second location of the data storage system with the transformed dataset in a registry maintained by the at least one DPU, wherein the registry is inaccessible to the host computing environment.

8. The system of claim 1, wherein the enabling of the access to the transformed dataset comprises enabling the access to the transformed dataset via a private internal virtual network switch established between the at least one DPU and the host computing environment.

9. The system of claim 1, wherein the operations further comprise:

receiving the request from a plugin associated with a data loader application residing on the host computing environment.

10. The system of claim 9, wherein the data loader application, in response to the enabling of the access to the transformed dataset, provides the transformed dataset to an artificial intelligence training application residing on the host computing environment.

11. A method, comprising:

loading, by a first system comprising at least one data processing unit (DPU), a dataset stored at a first location of a second system in response to a request received by the at least one DPU from a host computing environment for access to the dataset, wherein the first location is known to the at least one DPU and not known to the host computing environment, and wherein the dataset is stored at the first location in a first format;

storing, by the first system, a transformed dataset, resulting from the at least one DPU transforming the dataset from the first format to a second format that is different from the first format, at a second location of the second system that is different from the first location; and facilitating, by the first system, the access to the transformed dataset by the host computing environment at the second location of the second system.

12. The method of claim 11, wherein:

the first location of the second system is associated with a first storage device type, the second location of the second system is associated with a second storage device type that is different from the first storage device type, the loading of the dataset comprises loading the dataset from the first location of the second system via a first data access protocol associated with the first storage device type, and the storing of the transformed dataset comprises storing the transformed dataset at the second location of the second system via a second data access protocol associated with the second storage device type.

13. The method of claim 11, wherein the loading of the dataset comprises loading the dataset from the first location of the second system using authentication credentials for the first location as stored in a registry maintained by the at least one DPU, and wherein the registry is inaccessible to the host computing environment.

14. The method of claim 11, wherein the first format is a compressed format, and wherein the second format is a tensor format resulting from the at least one DPU converting the dataset from the compressed format to an uncompressed format and generating tensors representative of the dataset in the uncompressed format.

15. The method of claim 11, wherein the facilitating of the access to the transformed dataset comprises facilitating the access to the transformed dataset via a private internal virtual network switch established between the at least one DPU and the host computing environment.

16. A non-transitory machine-readable medium comprising computer executable instructions that, when executed by at least one data processing unit (DPU), facilitate performance of operations, the operations comprising:

loading a dataset stored at a first location of a data storage system in response to a request received from a computing system for access to the dataset, wherein the first location is known to the at least one DPU and not known to the computing system, and wherein the dataset is stored at the first location in a first format;

storing a transformed dataset, resulting from transforming the dataset from the first format to a second format that is different from the first format, at a second location of the data storage system that is different from the first location; and enabling the access to the transformed dataset by the computing system at the second location of the data storage system.

17. The non-transitory machine-readable medium of claim 16, wherein:

the first location of the data storage system is associated with a first storage device type, the second location of the data storage system is associated with a second storage device type that is different from the first storage device type, the loading of the dataset comprises loading the dataset from the first location of the data storage system via a first data access protocol associated with the first storage device type, and the storing of the transformed dataset comprises storing the transformed dataset at the second location of the data storage system via a second data access protocol associated with the second storage device type.

18. The non-transitory machine-readable medium of claim 16, wherein the loading of the dataset comprises loading the dataset from the first location of the data storage system using authentication credentials for the first location as stored in a registry maintained by the at least one DPU, and wherein the registry is inaccessible to the computing system.

19. The non-transitory machine-readable medium of claim 16, wherein the first format is a compressed format, and wherein the second format is a tensor format resulting from converting the dataset from the compressed format to an uncompressed format and generating tensors representative of the dataset in the uncompressed format.

20. The non-transitory machine-readable medium of claim 16, wherein the enabling of the access to the transformed dataset comprises enabling the access to the transformed dataset via a private internal virtual network switch established between the at least one DPU and the computing system.

* * * * *